United States Patent [19]

Fletscher

[11] Patent Number: 5,317,831

[45] Date of Patent: * Jun. 7, 1994

[54] FLUID SPRAY NOZZLE

[76] Inventor: Robert A. Fletscher, 23760 Alamitos Rd., San Jose, Calif. 95120

[ * ] Notice: The portion of the term of this patent subsequent to Feb. 9, 2010 has been disclaimed.

[21] Appl. No.: 971,937

[22] Filed: Nov. 5, 1992

Related U.S. Application Data

[62] Division of Ser. No. 672,096, Mar. 19, 1991, Pat. No. 5,184,418.

[51] Int. Cl.⁵ ............................................. A01M 7/00
[52] U.S. Cl. .................................. 43/124; 239/547; 239/566; 285/921
[58] Field of Search ................ 43/124, 132.1, 900; 239/200, 208, 209, 547, 566; 285/914, 921

[56] References Cited

U.S. PATENT DOCUMENTS

| | | | |
|---|---|---|---|
| 2,246,731 | 6/1941 | Hill | 43/124 |
| 2,631,058 | 3/1953 | Ingham | 239/566 |
| 3,091,401 | 5/1963 | Hruby | 239/547 |
| 3,212,719 | 10/1965 | Di Corpo | 239/566 |
| 4,523,780 | 6/1985 | Cheer | 285/921 |
| 4,807,668 | 2/1989 | Roberts | 239/547 |
| 4,880,167 | 11/1989 | Langa | 239/547 |

Primary Examiner—Kurt C. Rowan
Attorney, Agent, or Firm—Michael J. Hughes

[57] ABSTRACT

A termite protection system (10) for a wooden foundation structure (12) is disclosed having a plurality of perimeter pipe sections (34) which include integral nozzles orifices (66), and a plurality of interior pipes (38) with non-integral nozzles (44), for distributing a delivering termite control fluids. The pipes (34) and (38) each have a plurality of male ends (50) which can be permanently inserted into a female end (48) of another pipe (34) or (38) or accessory fittings such as "T" fittings (40) and elbow fittings (32). Longitudinal ridges (56) and (58) within each of the male ends (50) fit into receiver grooves (62) in each of the female ends (48) as an aid to orientation of the (34) and (38) and other components. The female ends (48) have interior locking teeth (64) for locking into ridge indentations (60) on the male sections (50) such that components snap together and cannot be easily disassembled. Fluids are introduced into the termite control system (10) through a service access unit (26) having a front plate (106) which has thereon data obtained from an initial system calibration such that service personnel will be informed as to the quantity of fluid and delivery pressure required to adequately protect the structure from termite infestation.

4 Claims, 8 Drawing Sheets

FLUID SPRAY NOZZLE

This is a divisional of copending application Ser. No. 07/672,096 filed on Mar. 19, 1991, now U.S. Pat. No. 5,184,418.

TECHNICAL FIELD

The present invention relates generally to the field of fluid delivery systems, and more particularly to a system for delivering liquid pesticides to the interior foundation areas of wooden structures. The predominant current usage of the permanent termite protection system of the present invention is as a fixture which is installed in wooden structures at the time of their construction.

BACKGROUND ART

The problem of damage caused to wooden structures by termites is not a new one. Quite a bit of research has gone into the development of effective and safe chemical products to combat the pests. However, no significant progress has been made regarding means for delivering these chemicals to the areas of structures where they are most needed. Currently, a pest control technician usually uses a hand carried sprayer to deposit the chemicals around the perimeter of the structure and onto those areas underneath the structure that can be reached by means of crawl spaces and the like. However, all too frequently, large areas under the structure cannot be reached by this means at all. More importantly, such areas are often some of most prone to termite infestation due to the fact that they are particularly dark, damp, and secluded. Not only is this method ineffective because it does not reach some of the most needed locations, it is expensive. The time and effort required to accomplish this job is significant. Because of the expense involved, and because termite damage is one of those things that is far too easy to ignore until it is too late, many home owners either neglect the task of termite control entirely or else they may attend to it all too infrequently. Of course, this only compounds the problem regarding the ineffectiveness of present methods.

An alternative method of termite control is to "tent" an entire structure and then to fumigate within the tent. Of course, the disadvantages in inconvenience to the residents of this extreme measure are obvious. Furthermore, this method is intended primarily to kill existing infestations, and is not very effective as a measure to provide long term protection. Certainly, it would be better to prevent the termite infestation which necessitates the need for this drastic sort of remedial action by regularly treating foundation areas of the structure with termite pesticides.

Clearly, a means to quickly, easily, and inexpensively treat the foundation areas of wooden structures, including interior portions, with termite control sprays would provide a significant improvement over any presently known method for termite spray delivery.

All of the prior art termite spray delivery methods within the inventor's knowledge have required a service technician to attempt to get into the most inaccessible areas underneath structures in an effort to be as complete as possible with coverage.

No prior art termite spray delivery method to the inventor's knowledge has successfully reached all of the most inaccessible areas under a structure with the spray. All successful applications to date have required that one expend a great deal of time and energy in an effort to be as thorough as possible in the delivery of termite control sprays.

DISCLOSURE OF INVENTION

Accordingly, it is an object of the present invention to provide a means to treat inaccessible areas under a wooden structure with termite control spray.

It is another object of the present invention to provide a means to quickly and inexpensively treat wooden portions of building foundations with preservative fluids.

It is still another object of the present invention to provide a cost effective means for providing protection against termite infestation.

It is still another object of the present invention to provide a termite protection system which can be installed with a minimum of effort.

It is yet another object of the present invention to provide a termite protection system which can be installed by a person having no special training or expertise.

It is still another object of the present invention to provide a termite protection system which is reliable in operation.

It is yet another object of the present invention to provide a means to periodically retreat structures with termite control sprays.

Briefly, the preferred embodiment of the present invention is a system of integrated tubing and nozzles which is installed in a wooden structure at the time of construction. The system has a minimal number of different type components which fit together easily such that an installer with a minimum of training and skill can quickly and correctly create the system from such components. Fittings having a unique means for interlocking provide for the ease of assembly while increasing the certainty of a correct installation.

The inventive system has a service access assembly through which pesticides are introduced. A cover plate on the service access assembly provides service personnel with information concerning unique aspects of a particular application. A perimeter subsystem having nozzles positioned to protect an inside perimeter of a structure is connected to the service access assembly. An interior pier protection subsystem has nozzles designed to meet the particular needs of that part of the application. Connecting sections and joints are applied as needed to complete an installation.

The termite protection system is sufficiently inexpensive in both hardware costs and installation labor costs to allow the expense of initial installation to be more than recouped from the reduced costs of annual servicing, as compared to conventional termite control costs. Significant additional benefit is derived from the increased protection provided by the present invention, as compared to that obtainable through prior art methods.

An advantage of the present invention is that even inaccessible areas under a wooden structure can be treated with termite spray.

A further advantage of the present invention is that labor and other costs associated with treating foundation areas of wooden structures is reduced.

Yet another advantage of the present invention is that the effectiveness of efforts to prevent termite infestation is increased.

Still another advantage of the present invention is that the termite protection system can be easily installed in a wooden structure at the time of construction.

Yet another advantage of the present invention is that a large inventory of different parts is not required to construct the termite protection system.

Still another advantage of the present invention is that the termite protection system is reliable in operation.

These and other objects and advantages of the present invention will become clear to those skilled in the art in view of the description of the best presently known modes of carrying out the invention and the industrial applicability of the preferred embodiments as described herein and as illustrated in the several figures of the drawing, in which like reference designations represent like features throughout.

BEST MODE FOR CARRYING OUT INVENTION

The best presently known mode for carrying out the invention is a termite protection system installed in a wooden structure. The predominant expected usage of the inventive termite control system is in the building construction industry, particularly in those geographical areas wherein efficient termite protection is most desirable.

Figure 1:
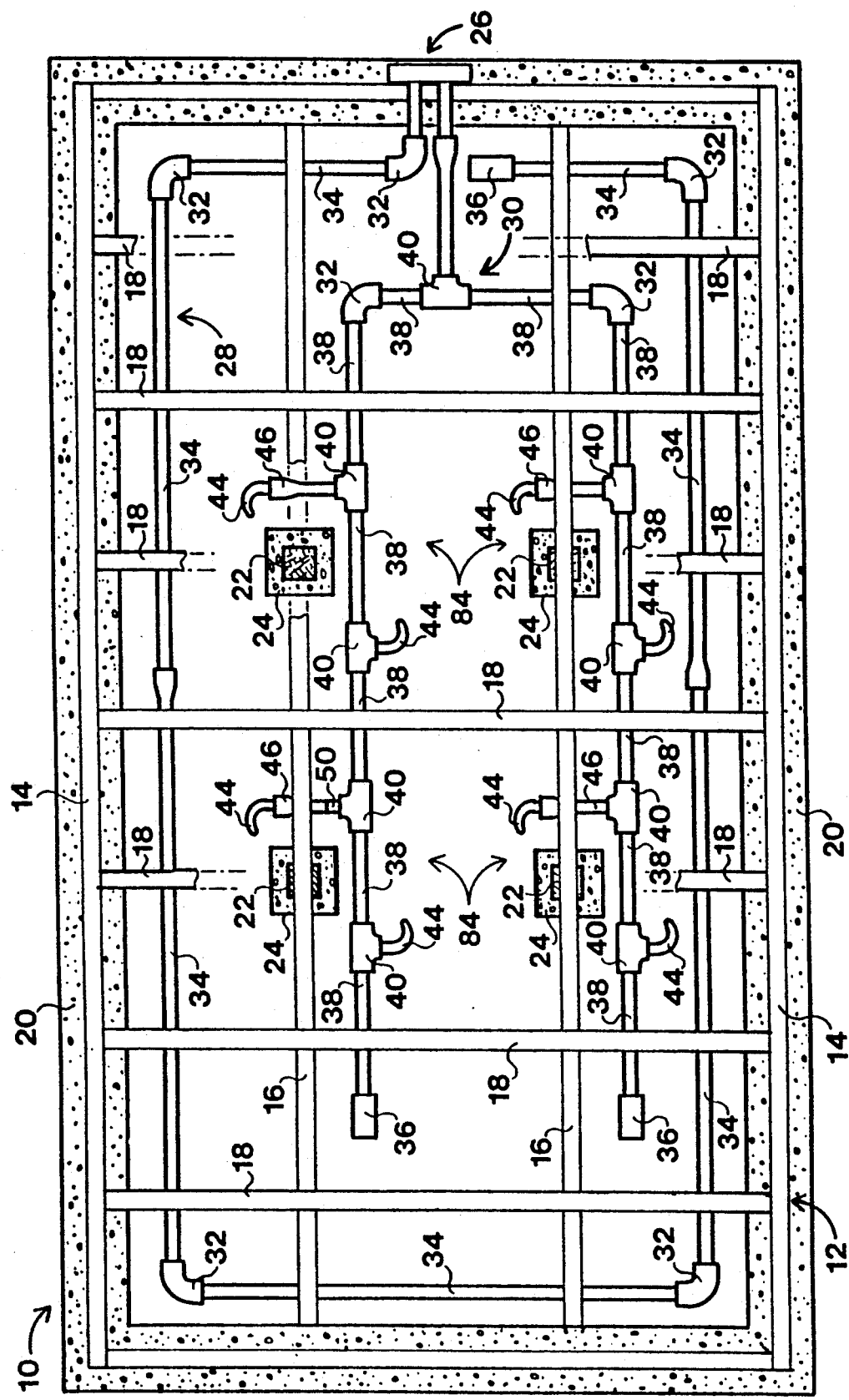
FIG. 1 is a top plan view of a termite control system, according to the present invention, installed in a rectangular wooden structure.

The termite control system of the presently preferred embodiment of the present invention is illustrated in a plan view in FIG. 1 and is designated therein by the general reference character 10 In some respects, the termite control system 10 is not unlike conventional polyvinyl chloride (PVC) water supply systems. Except for those components of the system 10 herein specifically described as being made of a different material, all components of the termite control system 10 are made of the same type material as is conventional PVC water pipe and fittings.

Depicted in FIG. 1 is a foundation structure 12 having a wooden perimeter structure 14, two foundation girders 16 and seven floor joists 18. The wooden perimeter structure 14 rests upon a concrete foundation 20, and the girders 16 are supported within the interior of the foundation structure 12 upon four wooden posts 22, and each of the wooden posts 22 rests upon a concrete pier 24. It should be emphasized that the foundation structure 12 is not drawn to scale, and that only so many floor joists 18 and other features of the foundation structure 12 are shown as are necessary to clearly illustrate the best presently known embodiment 10 of the present invention. It should further be noted that the foundation structure 12 may have additional components, such as a wooden block (not shown) between the posts 22 and the piers 24, or a sill board (not shown) between the concrete foundation 20 and the wooden perimeter structure 14, which are not relevant to the present invention.

As can be seen in the drawing of FIG. 1, the best presently known embodiment 10 of the invention includes a service access unit 26, for introducing fluid into the termite control system 10. The service access unit 26 will be described in greater detail hereinafter. In the best presently known embodiment 10 of the invention, connected to the service access unit 26 are a perimeter service subsystem 28 and an interior service subsystem 30. Additional subsystems (not shown) could be added to the termite control system 10, as required, to accommodate larger or more complicated structures.

The perimeter service subsystem 28, as illustrated in the drawing of FIG. 1 is assembled using a plurality of elbow fittings 32 (in this instance, five), a plurality of perimeter pipes 34 (in this instance, seven), and an end cap 36. As will be discussed hereinafter, the perimeter pipes 34, as manufactured, are all of equal length. However, the perimeter pipes 34 may readily be cut to length as desired. As can be seen in the illustration of FIG. 1, the perimeter pipes 34 have been cut to length as needed to fit within the foundation structure 12 Indeed, it is one of the most important features of the best presently known embodiment 10 of the invention that it is adaptable to fit within essentially any shape or size of foundation structure 12.

The interior service subsystem 30, as illustrated in the drawing of FIG. 1, is assembled using a plurality of interior pipes 38 (in this instance, twelve), an additional plurality of elbow fittings 32 (in this instance, two), and an additional plurality of end caps 36 (in this instance, two). In addition, the interior service subsystem 30 has a plurality of "T" fittings 40 (in this instance, nine), a plurality of nozzles 44 (in this instance, eight), and a plurality of nozzle extenders 46 (in this instance, four).

As is the object in any effort to treat the foundation structure 12 with termite preventative chemicals, whether it be by use of the inventive apparatus or by conventional methods, the critical areas to treat are those portions where the wooden perimeter structure 14 rests upon the concrete foundation 20, and where the posts 22 rest upon the concrete piers 24. This is because termites infest a structure by coming up from the ground into the foundation structure 12. Thoroughly treating these critical areas thus presents an impassable barrier to progression of the termites into the wooden foundation structure 12.

Figure 2:
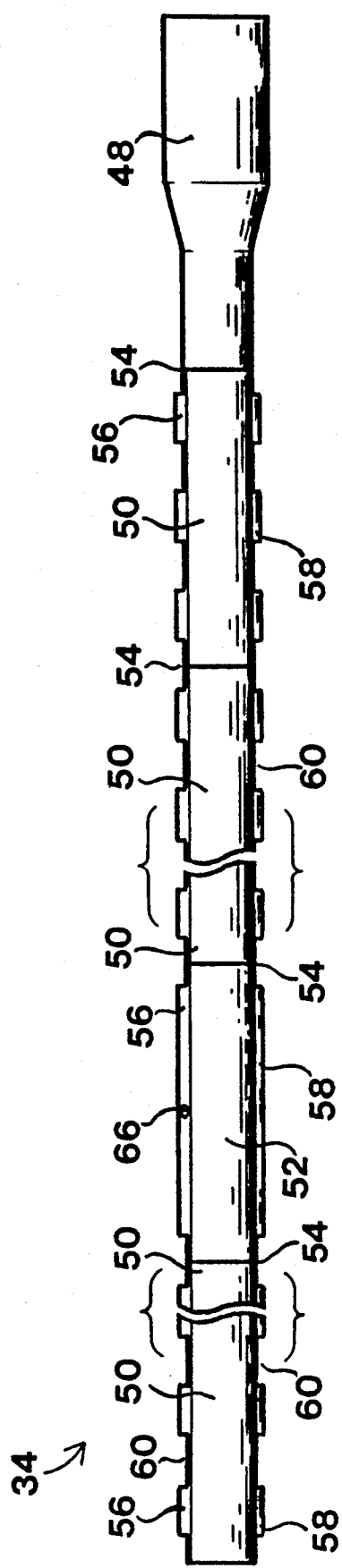
FIG. 2 is a partially broken elevational view of a perimeter pipe, according to the present invention.

Referring now to FIG. 2, wherein can be seen a detailed diagram of the perimeter pipe 34, it can be seen that the perimeter pipe 34 has a female end section 48, a plurality of male sections 50 and a plurality of spray nozzle sections 52. The male sections 50 and the spray nozzle sections 52 are separated by a plurality of divisional notches 54. The divisional notches 54 are provided as an aid to an installer. The perimeter pipe 34 may be cut at any of the divisional notches 54 using conventional plastic pipe cutting means to shorten the perimeter pipe 34 to length, as required. In a full length of perimeter pipe 34, which is eight feet three inches (2.51 meters) long, there are, in addition to the female end section 48, twenty nine of the male sections 50 and two of the spray nozzle sections 52. Specifically, in the presently preferred embodiment 10 of the invention, the perimeter pipes 34 have, sequentially beginning at the female end section 48, the female end section 48, followed by seven of the male sections 50, followed by one of the spray nozzle sections, followed by fourteen of the male sections 50, followed by one of the spray nozzle sections 50, followed by eight of the male sections 52. In the presently preferred embodiment 10 of the invention, the female end section 48 is six inches (0.15 meter) long and the male sections 50 and the spray nozzle sections 52 are each three inches (0.08 meter) long. Of course, as has been discussed previously herein, the perimeter pipes 34 are shortened, as needed, by cutting the perimeter pipes 34 at the divisional notches 54 during the installation process.

Figure 3:
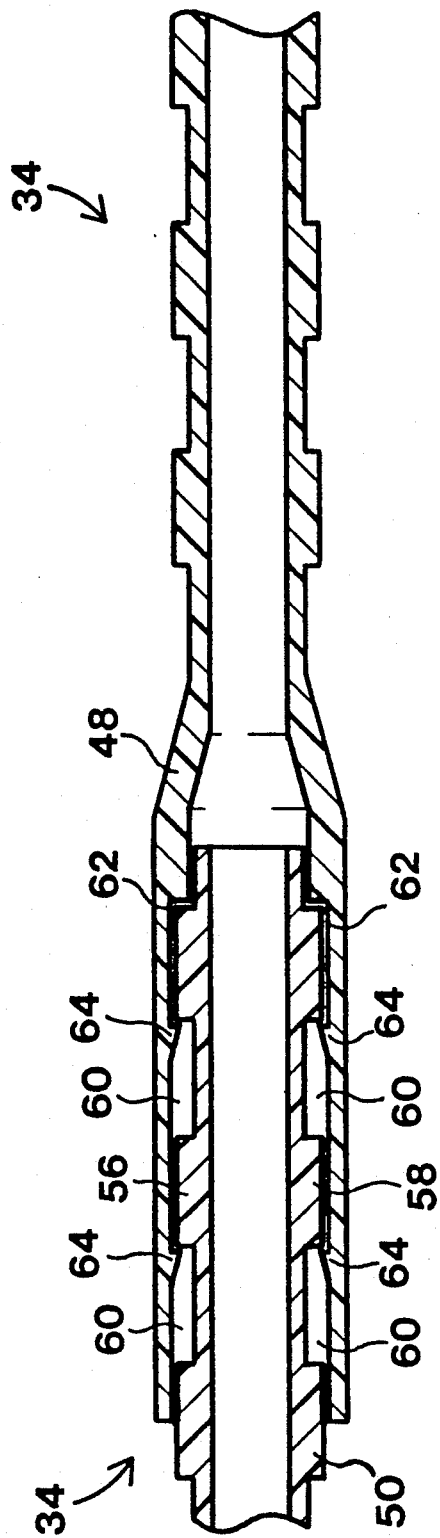
FIG. 3 is a cross sectional elevational view of a pipe male section fitted within a pipe female end section, according to the present invention.

The perimeter pipe 34 has a first longitudinal ridge 56 and a second longitudinal ridge 58, said second longitudinal ridge 58 being diametrically opposed to the first longitudinal ridge 56 on the exterior of the perimeter pipe 34. Those portions of the longitudinal ridges 56 and 58 which are on the male sections 50 have two ridge indentations 60 per male section 50, as is shown in FIG. 2. Also, the longitudinal ridges 56 and 58 are interrupted by the ridge indentations 60 in the areas of the divisional notches 54. The purpose of the longitudinal ridges 56 and the ridge indentations 60 therein can be seen more clearly in FIG. 3, wherein is shown a cross sectional view of one of the male sections 50 of one of the perimeter pipes 34 inserted within the female end section 48 of another of the perimeter pipes 34. In the view of FIG. 3 it can be seen that within the interior of the female end section 48 are two receiver grooves 62 within which the longitudinal ridges 56 and 58 are inserted. Within each of the receiver grooves 62 are two locking teeth 64 which fit within the ridge indentations 60 of the longitudinal ridges 56 and 58. Some small amount of force is required to insert the male section 50 within the female end section 48, as the female end section 48 and the male section 50 are sized such that both must distort slightly in shape in order to force the longitudinal ridges 56 and 58 past the locking teeth 64. When the locking teeth 64 encounter the ridge indentations 60, there is sufficient room within the ridge indentations 64 to accommodate the locking teeth 64, thus allowing the female end section 48 and the male section 50 to return to their original shapes. Thus, once the male section 50 is inserted within the female end section 48, it cannot be removed without destroying the perimeter pipe 34. This "snap together" type of assembly is ideally suited for the purpose, since the presently preferred embodiment 10 of the invention is intended for permanent installation, and further since ease of installation is a primary concern. It should be noted that it is not an objective of the present invention that connections between components be absolutely free of any leakage. It is thought that some small amount of leakage is tolerable, since this is a low pressure system which is designed to be used for only a few minutes each year, and since other considerations such as component cost and ease of assembly are more important in this case.

Figure 4:
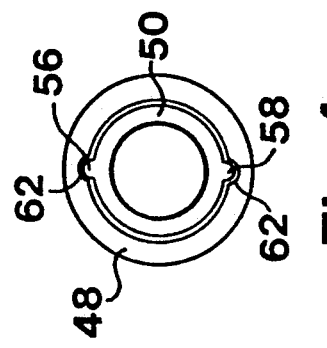
FIG. 4 is a cross sectional end view of a pipe male section fitted within a pipe female end, according to the present invention.

FIG. 4 is a cross sectional end view of one of the male sections 50 of one of the perimeter pipes 34 inserted within the female end section 48 of another of the perimeter pipes 34. This view is provided to illustrate the fact that the fitting of the first longitudinal ridge 56 and the second longitudinal ridge 58 within the receiver grooves 62 aligns the male end fitting 50 within the female end fitting 48 as an aid to an installer in adjoining the perimeter pipes 34 in correct alignment. It should also be noted that the longitudinal ridges 56 and 58 lend strength to the perimeter pipe 34 thus helping to prevent sagging of the perimeter pipe 34 in any unsupported locations.

Figure 5:
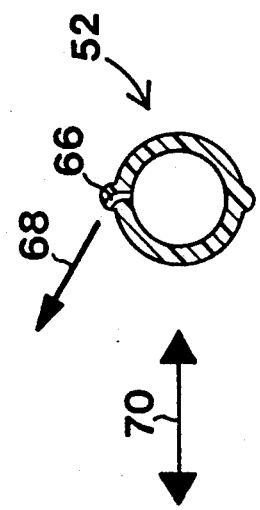
FIG. 5 is a cross sectional end view of spray nozzle section of a perimeter pipe of the present invention taken at a nozzle orifice.

Referring again to FIG. 2, it can be seen that the spray nozzle section 52 has a nozzle orifice 66 located on the first longitudinal ridge 56. Referring now to FIG. 5, wherein is shown a cross sectional end view of a spray nozzle section 52 taken at the nozzle orifice 66, it can be seen that the nozzle orifice 66 is positioned to disperse any fluid contained within the spray nozzle section 52 in a fluid dispersal direction 68 which is approximately thirty five degrees elevated in relation to a horizontal direction 70. This insures that spray from a perimeter pipe 34 (FIG. 1) located approximately twenty inches (0.51 meter) from the wooden perimeter structure 14 will strike the wooden perimeter structure above the concrete foundation 20 such that fluid will run down the wooden perimeter structure 14 under the force of gravity and thus coat the wooden perimeter structure 14 with fluid.

Figure 6:
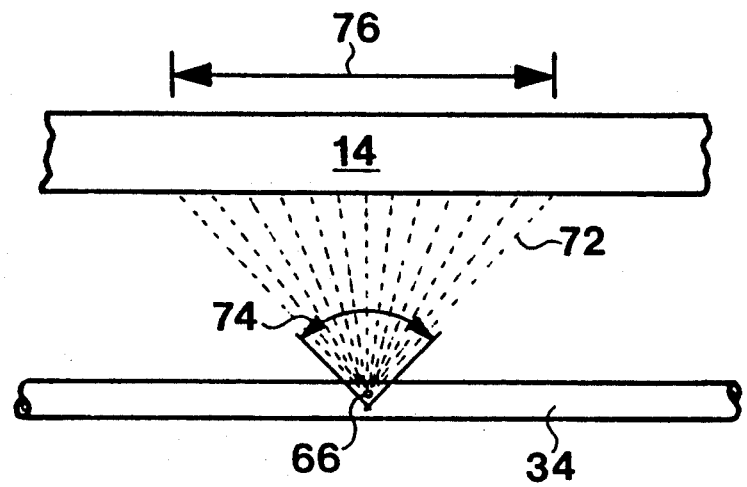
FIG. 6 is a top plan view of a portion of the termite control system of the present invention showing relative positions of a perimeter pipe and a wooden perimeter structure.

According to the above described construction of the perimeter pipes 34, nozzle orifices 66 are located along any potential arrangement of perimeter pipes 34 (regardless of the lengths to which the perimeter pipes 34 might be cut) at intervals no greater than fifty inches (1.27 meter). Now referring to FIG. 6, which is a top plan view of a portion of the termite control system 10 showing a detail of the relationship between the perimeter pipes 34 and the wooden perimeter structure 14, the nozzle orifice 66 is constructed to produce a spray pattern 72 having a spray pattern angle 74 of approximately one hundred thirty degrees. When the perimeter pipe 34 is situated approximately twelve inches (0.30 meter) from the wooden perimeter structure 14, as in the best presently known embodiment 10 of the invention, a coverage width 76 is at least approximately fifty inches (1.27 meter), thus assuring complete coverage of the wooden perimeter structure 14 when the perimeter pipes 34 are adjoined as described herein.

Figures 7, 8:
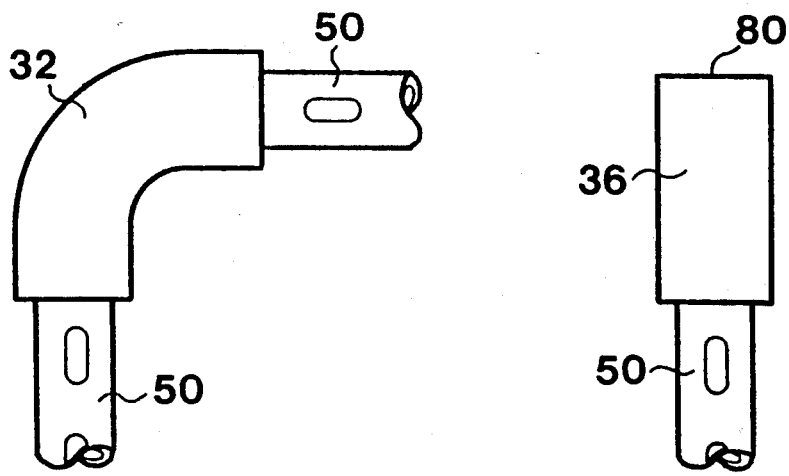
FIG. 7 is a plan view of an elbow fitting, according to the present invention.
FIG. 8 is a elevational view of an end cap, according to the present invention.

Components of the perimeter service subsystem 28 not previously discussed in detail are the elbow fitting 32 and the end cap 36. FIG. 7 is a plan view of the elbow fitting 32. The purpose of the elbow fitting 32 is to join at a right angle two other components having male sections 50, as is depicted in FIG. 7.

FIG. 8 is a detail view of an end cap 36 with a male section 50 inserted therein. Interior construction (not visible in the view of FIG. 8) of the end cap 36 is like that of the female end section 48 (FIG. 3) except that it is closed at a closed end 80 so as to prevent the flow of fluid past that point.

Figure 9:
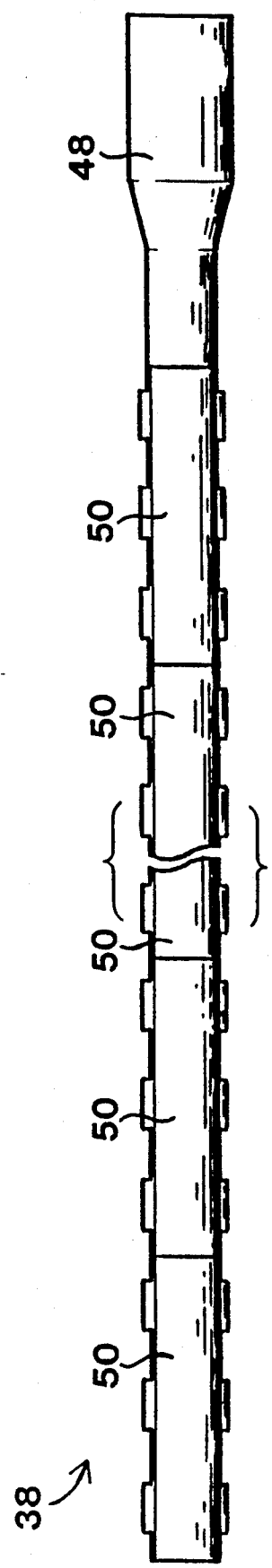
FIG. 9 is a partially broken elevational view of an interior pipe, according to the present invention.

Now beginning a discussion of the interior service subsystem 30 (FIG. 1), as has been discussed previously herein, the interior service subsystem is constructed so as to provide protective fluids to the supporting posts 22 where the posts rest upon the piers 24. The elbow fittings 32 and end caps 36 of the interior service subsystem 30 are identical to those used in the perimeter service subsystem 28. The interior pipes 38 are quite similar to the perimeter pipes 34, differing only in that, unlike the perimeter pipes 34, the interior pipes 38 do not have any spray nozzle sections 52 (FIG. 2). Referring now to FIG. 9, which is a partially broken elevational view of one of the interior pipes 38, it can be seen that the female end section 48 of the interior pipe 38 is connected to a plurality of the male sections 50. In a full, uncut length of the interior pipe 38 which, in the presently preferred embodiment 10 of the invention is eight feet three inches (2.51 meters) long, there are thirty one of the male sections 50 and one of the female end sections 48.

Figure 10:
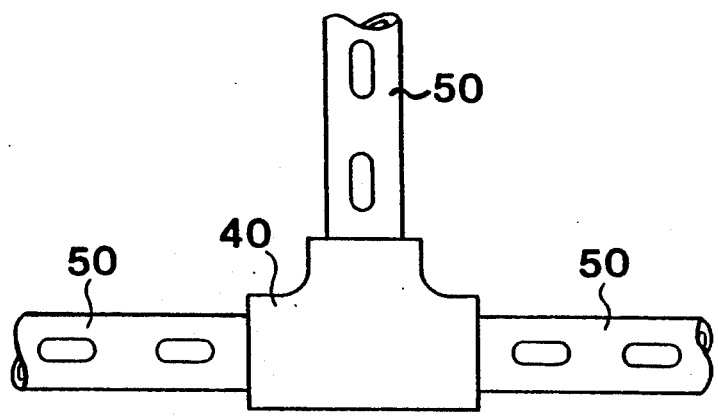
FIG. 10 is a plan view of a "T" fitting, according to the present invention.

The "T" fitting 40 is depicted in the plan view of FIG. 10 with three of the male sections 50 inserted therein in much the same fashion as conventional "T" pipe connectors (not shown).

Figure 11:
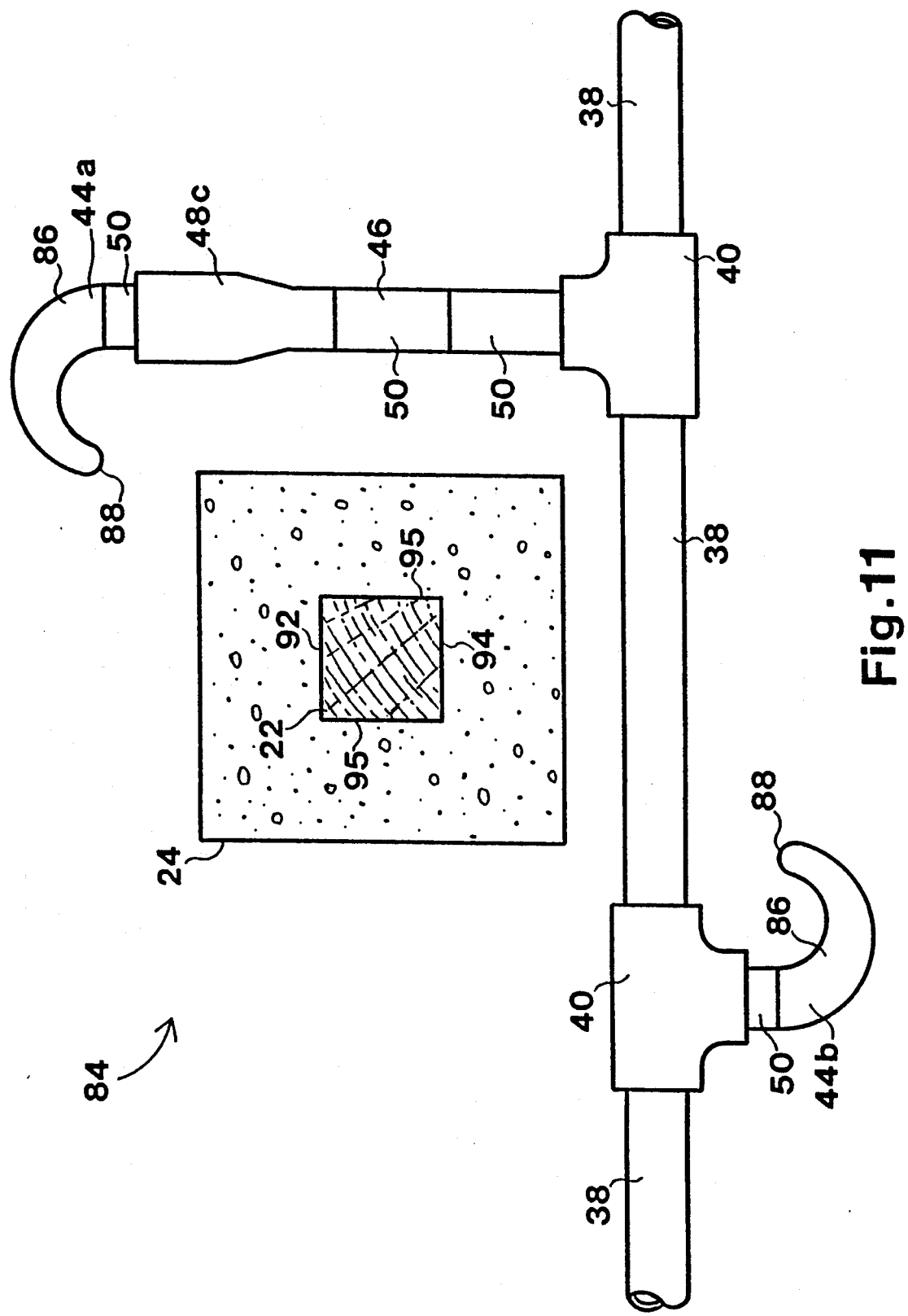
FIG. 11 is a plan view of a portion of the termite control system of the present invention showing the portion of the system adjacent to a foundation supporting post.

FIG. 11 depicts a post service group 84, which is a portion of the interior service subsystem located in the immediate vicinity of the foundation supporting posts 22. In the detailed view of FIG. it can be seen that post service group 84 has a first nozzle 44a and a second nozzle 44b directed roughly toward opposing corners of the post 22 such that spray (not shown) emanating from the nozzles 44a and 44b would strike all four sides of the post 22. In the presently preferred embodiment 10 of the invention, the nozzles 44a and 44b each have a curved section 86 having an approximately 170° curve, an integral spray nozzle tip 88 and one of the male sections 50 on the other for connection of the nozzles 44a and 44b to the remainder of the termite control system 10.

A means for diverting some fluid from the interior pipes 38 to the nozzles 44a and 44b is provided by the "T" fittings 40. The nozzle extender 46 has one of the female end sections 48 and a plurality of the male sections 50 (in the example of FIG. 11, two, although the quantity may vary with the application). As can be seen in the view of FIG. 11, the nozzle extender 46 provides a means to position the first nozzle 44a such that it is directed toward a far side 92 of the post 22 (the side furthest from the interior pipes 38), while the second nozzle 44b, servicing a near side 94 of the post 22, has no need for such means for extension. As discussed previously, the nozzles 44a and 44b are directed such that spray therefrom strikes the post 22 above the pier 24 so that fluid will flow down the post 22 and thus the critical area where the pier 24 and post 22 meet will be protected. The nozzles 44a and 44b are further directed such that spray therefrom coats the near side 94, the far side 92, and a pair of connecting sides 95 of the post 22.

It should be noted that spray from the nozzles 44a and 44b is directed slightly downward, in addition to being curved approximately 170° as previously discussed. The slight downward bend is dictated by the fact that spray from the second nozzle 44b must pass underneath the interior pipe 38.

It should further be noted that the nozzle extenders 46 may be provided, as economy dictates, as separate component parts or, alternatively, a user may create a nozzle extender 46 on a job site by utilizing a short section of one of the interior pipes 38 (FIG. 9) including the female end section 48.

Figure 12:
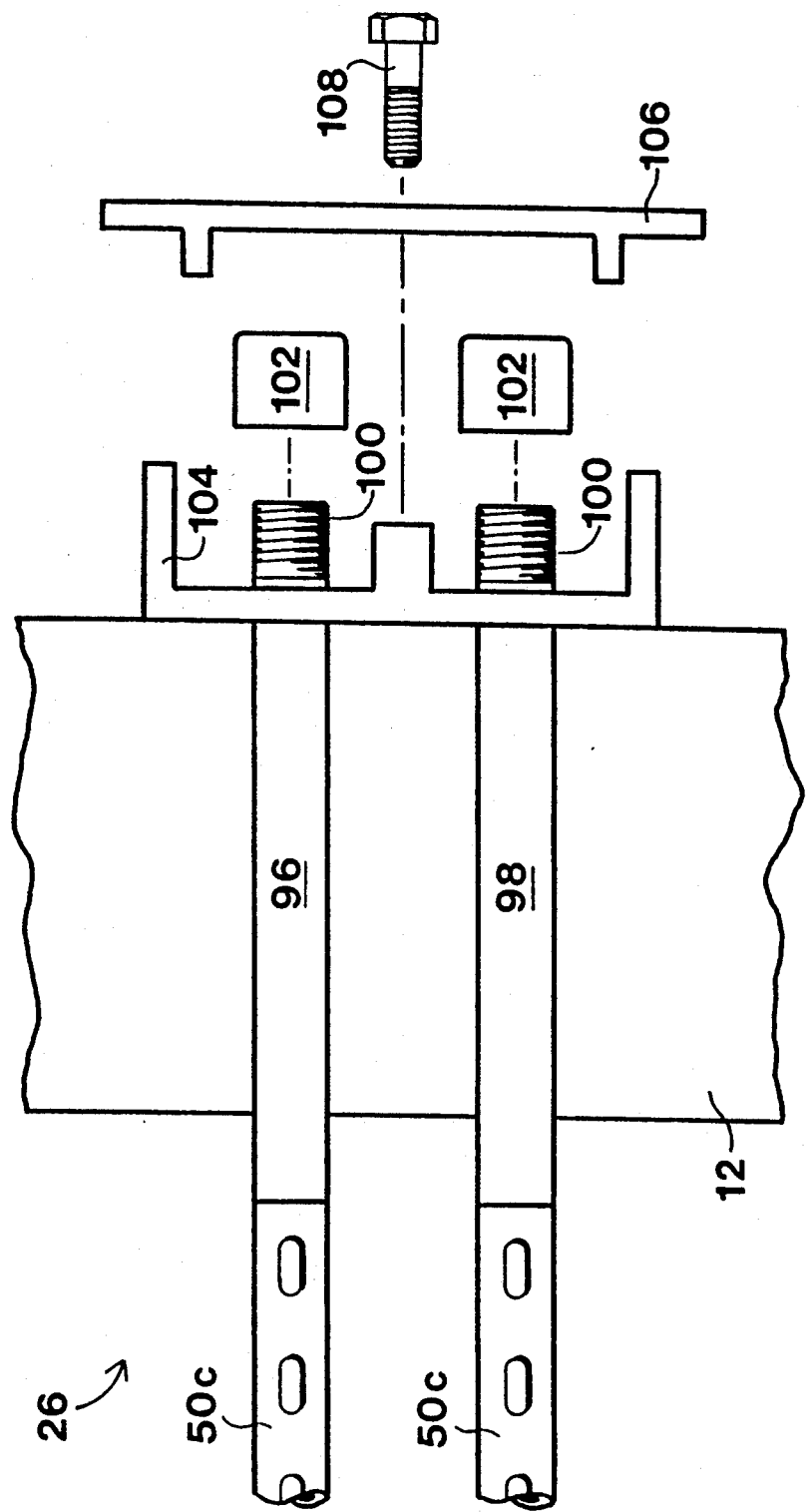
FIG. 12 is an exploded plan view of a service access unit, according to the present invention.

FIG. 12 is a partially exploded cross sectional plan view of the service access unit 26. In the best presently known embodiment 10 of the invention, the service access unit 26 is made of brass. As discussed previously herein, the service access unit 26 provides a means for introducing fluids into the perimeter service subsystem 28 and the interior service subsystem 30. The service access unit 26 of the best presently known embodiment 10 of the present invention has a first access pipe 96 and a second access pipe 98 for providing fluids to the perimeter service subsystem 28 and the interior service subsystem 30, respectively. Each of the access pipes 96 and 98 is provided with an access pipe male section 50a for connection to the respective subsystems 28 and 30. Each of the access pipes 96 and 98 is further provided with a screw fitting end 100 for connection to a termite control fluid source (not shown) to be provided by a servicing technician as required. Each of the screw fitting ends 100 is provided with a screw on cap 102 to protect the screw fitting end 100 when it is not in use, and to prevent debris and other such contaminants from entering the termite control system 10. As shown in the drawing of FIG. 12, the access pipes 96 and 98 extend through the wooden perimeter structure 14 such that termite control fluids might be introduced into the termite control system 10 from outside the foundation structure 12.

The service access unit 26 is provided with a backing plate 104 which can be fastened to the wooden perimeter structure 14 with wood screws (not shown). In the presently preferred embodiment 10 of the invention, the backing plate 104 and the access pipes 96 and 98 are formed as a single unit. A front plate 106 is fastened to the backing plate 104 by a front plate fastening bolt 108, when the termite control system 10 is not in use. The front plate 106 serves two purposes. Firstly, the front plate 106 provides additional protection for the service access unit 26. Secondly, the front surface (not visible in the view of FIG. 12) of the front plate 106 provides a surface upon which calibration data pertinent to the specialized installation of the termite control system 10 is inscribed. Calibration will be discussed in more detail hereinafter in relation to the industrial applicability of the present invention.

Figure 13:
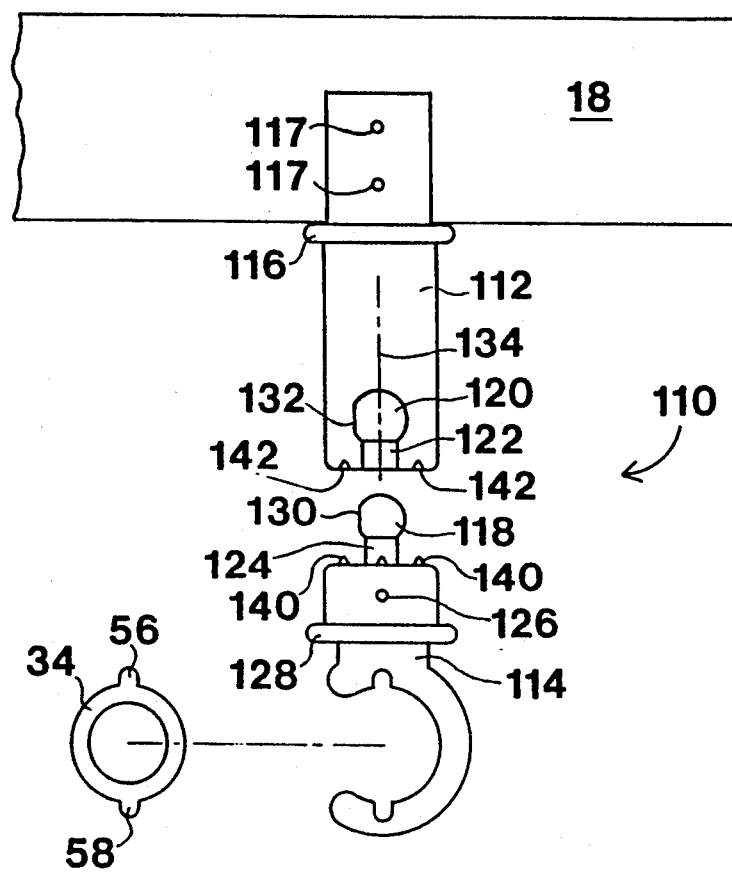
FIG. 13 is a pipe hanger assembly, according to the present invention.

Now beginning a discussion of a means for attaching the termite control system 10 to the foundation structure 12, FIG. 13 is a pipe hanger 110 for attaching either perimeter pipes 34 (FIG. 1) or interior pipes 38 to the foundation girders 16 (FIG. 1) and floor joists 18 (FIG of the foundation structure 12 (or to other wooden components of the foundation structure 12 not specifically disclosed herein, as required). The pipe hanger 110 consists of a hanger bracket 112 and a pipe holding portion 114. The pipe hanger bracket 112 has a first positioning collar 116 for use in positioning the pipe hanger bracket 112. When the first positioning collar is abutted against the floor joist 18, as depicted in FIG. 13, the pipe hanger bracket 112 is properly positioned such that all such pipe hanger brackets 112 which are attached to like levels of the foundation structure 112 will be at like levels. The pipe hanger bracket 112 has two bracket nail holes 117 through which nails (not shown) are driven to secure the pipe hanger bracket 112 to the floor joist 18.

The pipe holding portion 114 (shown detached from the pipe hanger bracket 112 in the view of FIG. 13) is attached to the pipe hanger bracket 112 by means of a ball 118 located at the top of the pipe holding portion 114 and a socket 120 located on the pipe hanger bracket 112. The socket 120 and a slot 122 below the socket 120 are open on one side only (the side shown in the view of FIG. 13) such that the ball 118 may be inserted into the socket 120 from that side such that a ball neck portion 124 extends downward through the slot 122.

The pipe holding portion 114 of the pipe hanger 110 used in the presently preferred embodiment 10 of the invention, also has a holding portion nail hole 126, and a second positioning collar 128 so that the pipe holding portion 114 can be, if needed, fastened directly to a foundation girder 16 (FIG. 1) or other lower portion of the foundation structure 12 without a pipe hanger bracket 112. As can be seen in the view of FIG. 13, the pipe holding portion 114 is shaped to accommodate the longitudinal ridges 56 and 58 of the perimeter pipe 34, or of any other similar component (not shown in the view of FIG. 13) having such ridges 56 and 58. In order to insert the perimeter pipe 34 within the pipe holding portion 114 it is necessary to exert some small amount of force sufficient to temporarily distort the shape of the pipe holding portion 114. Once the perimeter pipe 34 is inserted within the pipe holding portion 114, it cannot be easily removed.

In the presently preferred embodiment 10 of the invention, the ball 118 has a ball flat side 130 which corresponds to a socket opening flat side 132 such that the ball 118 can only be inserted into the socket 120 with the ball flat side 130 aligned with the socket opening flat side 132.

Figure 14:
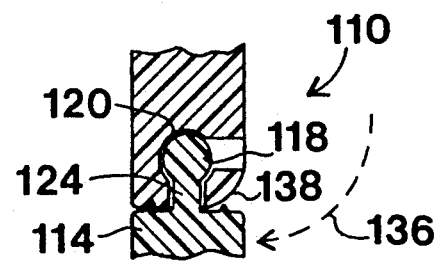
FIG. 14 is a rotated cross sectional view of the pipe hanger assembly of FIG. 13.

Referring now to FIG. 14, wherein a portion of the pipe hanger 110 is shown in cross section, the ball 118 is shown inserted within the socket 120. It should be noted that the view of FIG. 4 shows the pipe hanger 110 rotated by ninety degrees around a vertical axis 134 as compared to the view of FIG. 13, and further that the pipe hanger 110 is shown cut through at the Vertical axis 134. As can be seen in the view of FIG. 14, the pipe holding portion 114 can be pulled into place in a direction indicated by a directional reference arrow 136 past a rounded corner 138 of the pipe hanger bracket 112. This action pulls the ball neck portion 124 down the required ⅛ inch (0.32 cm.) within the socket 120 such that the pipe holding portion 114 is held firmly against the pipe hanger bracket 112.

Referring again to FIG. 13, a plurality (in this instance six, of which three are visible in the view of FIG. 13) of projections 140 are provided on the pipe holding portion 114 which mate with a like plurality of recesses in the pipe hanger bracket 112 when the pipe holding portion 114 is mated with the pipe hanger bracket 112 as shown in the view of FIG. 14. Mating of the projections 140 with the recesses 142 causes the pipe holding portion 114 to resist rotation relative to the pipe hanger bracket 112 after installation.

It should be noted that the pipe hanger 110 depicted in FIG. 13 is a versatile and relatively complex component designed to provide maximum adaptability for the best presently preferred embodiment 10 of the invention. It is contemplated that economy will dictate that alternative pipe hangers (not shown) without the ball 118 and socket 120 arrangement, and of varying lengths, may also be provided. which alternative units may be less expensive and will perhaps be specifically adapted to particular applications.

Figure 15:
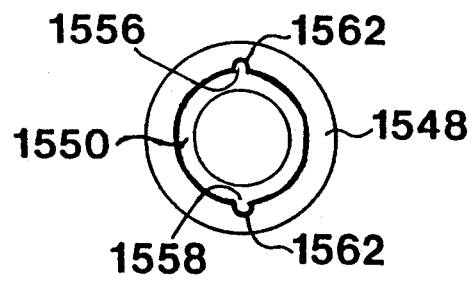
FIG. 15 is a cross sectional end view of a pipe male section fitted within a pipe female end section, similar to the view of FIG. 4, depicting a variation incorporated in an alternate preferred embodiment of the present invention.

FIG. 15 is a view similar to that of FIG. 4 showing an equally preferred alternative embodiment of a female end section 1548 with an alternative male section 1550 inserted therein. In this view it can be seen that a first longitudinal ridge 1556 and a second longitudinal ridge 1558 of the alternative male section 1548 are of unequal sizes (the first longitudinal ridge 1556 being somewhat larger than the second longitudinal ridge 1558), and that the alternative receiver grooves 1562 of the alternative female end section 1548 are sized accordingly to receive the differentially sized longitudinal ridges 1556 and 1558. This arrangement provides an additional means to insure that the termite control system 10 is properly assembled. By modifying all of the female end sections 48 and male sections 50 of the preferred embodiment 10 of the invention according to the alternative male section 1550 and female end section 1548 depicted in FIG. 15 and as disclosed herein, such that the various components of the termite control system 10 can be aligned in only a single orientation, the inventor has increased even further the ease of assembly of the inventive termite control system 10.

As is shown above, in great part, the termite control system 10 according to the present invention resembles prior art conventional fluid supply piping systems in many respects. The substantial differences exists in the inclusion of snap together low pressure fittings, integral nozzles, calibration method (discussed hereinafter in relation to the industrial applicability of the invention), and the unique combination of components making the inventive termite control system 10 well suited for the delivery of termite control chemicals and easy and inexpensive to install. No significant changes of materials are envisioned nor are any special constructions required.

Various modifications may be made to the invention without altering its value or scope. For example, additional chemicals, such as dry rot preventatives and other wood preservatives could be delivered along with termite control chemicals. Similarly, while the best presently known embodiment 10 of the invention is described herein as being particularly adapted for installation in new construction, it could easily be adapted to be suitable for retrofitting existing structures. Also, while the present invention has been described herein in terms of an application wherein a wooden building is specifically protected from termites, the inventive mechanism is equally adaptable to other building materials and for protection against other hazards. For example, a partially steel structure could be protected against rust by periodic treatment of an anti-rust fluid using the inventive mechanism.

Another conceivable change would be to construct the components of the invention using a mixture of female end fittings 48 and male end fittings 50 on such components as "T" fittings and elbows, such that components could be joined together in a continuous alternating series of male, female, male, etc.. Many other such incidental changes in the arrangements of components are possible. For example, while the presently preferred embodiment 10 of the invention has been described herein has having interior pipes 38 and perimeter pipes 34, supplied in standard eight foot long lengths, it might well prove to be economically feasible to provide these components in a variety of lengths. Also, it may prove to be desirable to provide angled fittings in varieties such as forty five degree types.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The termite control system 10 of the present invention is suitable for installation in any structure having wooden structural components. The predominant current usages are for providing a means to provide continuing protection from termite damage to wood framed structures, which means is installed during the initial instruction of the structure.

The termite control system 10 of the present invention may be utilized in any building in which it may be desired to treat the structure with termite control chemicals. In use, the present invention provides protection superior to any conventional termite control chemical application method. The termite control system 10 of the present invention is easy and economical to install. Indeed, no tools except a hammer, a plastic pipe cutter and those tools required to install the service access unit 26 are required.

In practice, in order to insure proper coverage of the foundation structure, the termite control system 10 is calibrated when it first installed and before the installation is hidden from view by finished construction. An installer can connect a source of inexpensive and nontoxic fluid (such as water) to the service access unit 26. Then, with a minimum amount of experimentation, a proper quantity of fluid and a proper delivery pressure (or, alternatively, a proper delivery pressure and a proper time period at which fluid should be delivered at that pressure) is determined, and that data is inscribed on the front plate 106 of the service access unit 26. Thus, a service technician, at any future date, by supplying termite control chemical fluids according to the data engraved on the front plate 106 can properly treat even those portions of the foundation structure 12 that can no longer be seen (at least without harming the attached building).

Since the termite protection systems of the present invention may be readily constructed and may be installed by persons of ordinary skill in the construction industry, and since the attendant benefits offer a significant increase in efficiency of termite protection offered by conventional termite control chemicals, it is expected that they will be acceptable in the industry as adjuncts to conventional wooden structure construction, particularly in areas especially prone to termite infestation, and in more expensive structures wherein initial cost of the inventive system does not represent a major portion of the overall construction expense. For these and other reasons, it is expected that the utility and industrial applicability of the invention will be both significant in scope and long-lasting in duration.

In this claim:

1. A fluid spray apparatus, comprising:
a tubular pipe;
a ridge on the outer surface of said pipe extending at least substantially along the length thereof; and
a passage extending from the interior of said pipe through said ridge such that fluid within said pipe can be forced through said passage by pressurizing the fluid within said pipe; wherein
said ridge is formed such that it fits within a notch of a female pipe fitting and further such that said pipe will fit within the female pipe fitting only when said ridge is aligned with the notch so that, when said pipe is fitted within the female pipe fitting, a direction of spray from said passage is determined by the orientation of the notch.

2. The fluid spray apparatus of claim 1, wherein:
said passage is cured such that a spray pattern can be produced by the action of forcing the fluid through said passage.

3. The fluid spray apparatus of claim 1, wherein:
said passage is sized according the viscosity of the fluid such that a spray pattern is produced by the action of forcing the fluid through said passage.

4. The fluid spray apparatus of claim 1, wherein:
said ridge is formed as a part of said pipe such that said ridge adds rigidity to said pipe.

* * * * *